(12) United States Patent
Higuchi et al.

(10) Patent No.: US 11,418,597 B2
(45) Date of Patent: Aug. 16, 2022

(54) SYSTEM AND METHOD FOR VALUE-ANTICIPATING TASK OFFLOADING

(71) Applicant: Toyota Motor Engineering & Manufacturing North America, Inc., Plano, TX (US)

(72) Inventors: Takamasa Higuchi, Mountain View, CA (US); Seyhan Ucar, Mountain View, CA (US); Chang-Heng Wang, Mountain View, CA (US); Onur Altintas, Mountain View, CA (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 121 days.

(21) Appl. No.: 17/066,056

(22) Filed: Oct. 8, 2020

(65) Prior Publication Data

US 2022/0116456 A1 Apr. 14, 2022

(51) Int. Cl.
*G06F 15/16* (2006.01)
*H04L 67/12* (2022.01)
(Continued)

(52) U.S. Cl.
CPC ........... *H04L 67/12* (2013.01); *B60W 40/105* (2013.01); *G06F 9/5038* (2013.01);
(Continued)

(58) Field of Classification Search
CPC ......... H04L 67/12; H04L 47/76; H04L 67/76; H04L 67/1095; G06N 20/00; G06F 9/5038; G06F 9/5072; G06F 2209/509
(Continued)

(56) References Cited

U.S. PATENT DOCUMENTS 10,628,222 B2 4/2020 Liu et al.
10,705,884 B2 7/2020 Altintas et al.
(Continued)

FOREIGN PATENT DOCUMENTS

WO 2020005276 A1 1/2020

OTHER PUBLICATIONS

Wang et al., "Multi-Access Edge Computing based Vehicular Network: Joint Task Scheduling and Resource Allocation Strategy," 2020 IEEE International Conference on Communications Workshops (ICC Workshops), 6 pages (2020).
(Continued)

*Primary Examiner* — Moustafa M Meky
(74) *Attorney, Agent, or Firm* — Christopher G. Darrow; Darrow Mustafa PC

(57) ABSTRACT

A system, method, and non-transitory computer-readable medium allows for value-anticipating task offloading. The system may include one or more processors and a memory having a task manager module. The task manager module causes the one or more processors to receive a task identifier of a computational task for an application being utilized by a vehicle processor of a vehicle and a state vector describing at least one state of the vehicle and determine, using a utility function, a utility score of the computational task using the task identifier and the state vector which represents an improvement in a functioning of the application if the computational task is offloaded to an external system for processing. Based on the utility score, the one or more processors may offload the computational task to the external system, process the computational task by the vehicle processor of the vehicle, or discard the computational task.

20 Claims, 7 Drawing Sheets

(51) Int. Cl.
 H04L 67/1095 (2022.01)
 H04L 47/76 (2022.01)
 B60W 40/105 (2012.01)
 G06F 9/50 (2006.01)
 G06K 9/62 (2022.01)
 G06N 20/00 (2019.01)
(52) U.S. Cl.
 CPC ......... *G06F 9/5072* (2013.01); *G06K 9/6256* (2013.01); *G06N 20/00* (2019.01); *H04L 47/76* (2013.01); *H04L 67/1095* (2013.01); *B60W 2520/06* (2013.01); *G06F 2209/509* (2013.01)
(58) Field of Classification Search
 USPC ......................................................... 709/219
 See application file for complete search history.

(56) References Cited

U.S. PATENT DOCUMENTS

| | | | | |
|---|---|---|---|---|
| 10,997,015 B2* | 5/2021 | Singh | ................... | G06N 20/00 |
| 2014/0201761 A1* | 7/2014 | Dalal | .................. | G06F 12/1081 |
| | | | | 718/108 |
| 2020/0035099 A1* | 1/2020 | Sivakumar | ............... | G08G 1/22 |
| 2020/0178198 A1* | 6/2020 | Ding | ..................... | H04W 60/04 |
| 2020/0278901 A1* | 9/2020 | Singh | ....................... | G06N 5/02 |

OTHER PUBLICATIONS

Wang et at., "QoS-enabled resource allocation algorithm in internet of vehicles with mobile edge computing," IET Commun., 2020, vol. 14 Iss. 14, pp. 2326-2333.

Gao et al., "A QoE-Oriented Scheduling Scheme for Energy-Efficient Computation Offloading in UAV Cloud System," IEEE Access, vol. 7, pp. 68656-68668 (2019).

Tahmasebi et al., "An efficient model for vehicular cloud computing with prioritizing computing resources," Peer-to-Peer Netw. Appl. 12, 1466-1475 (2019).

Higuchi et al., "On the Feasibility of Vehicular Micro Clouds," 2017 IEEE Vehicular Networking Conference (VNC), pp. 179-182.

Higuchi et al., "Value-Anticipating V2V Communications for Cooperative Perception," Proceedings of the 2019 IEEE Intelligent Vehicles Symposium (IV), Paris, France, 2019, pp. 1947-1952.

* cited by examiner

SYSTEM AND METHOD FOR VALUE-ANTICIPATING TASK OFFLOADING

TECHNICAL FIELD

The subject matter described herein relates, in general, to systems and methods for offloading computational tasks from a vehicle to an external system, such as another vehicle, a server, or a vehicular micro cloud.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some current vehicles have numerous sensors for sensing the environment around the vehicle. Because of information generated by the sensors, vehicles equipped with these types of sensor systems generally have one or more processors for receiving and interpreting the information generated by the sensors. For example, some vehicles have the ability to detect objects external to the vehicle and, based on one or more algorithms, cause the vehicle to perform some type of corrective action.

Other vehicles have even more powerful sensor suites and corresponding processors. In some cases, these vehicles have the ability to not only detect multiple objects with the scene, which is generally processor intensive, but also track objects within the scene. This may be accomplished by utilizing processor intensive algorithms that are able to draw bounding boxes around detected objects and then, utilizing these bounding boxes, track objects associated with these bounding boxes.

However, these types of features are extremely processor intensive. In some cases, vehicles with less powerful processing capabilities execute a lighter weight version of an algorithm. For example, vehicles with powerful processing capabilities may utilize an object detection and/or tracking algorithm that is computationally intensive but very accurate. Vehicles with less powerful processing capabilities may utilize a lighter weight version of the algorithm that may not be as accurate in detecting and/or tracking objects. One solution to this problem is to offload computationally complex tasks from vehicles with less powerful processing systems to vehicles, vehicular micro clouds, and/or external servers, such as edge servers, which have available computational resources to process more sophisticated algorithms.

SUMMARY

This section generally summarizes the disclosure and is not a comprehensive explanation of its full scope or all its features.

In one example, a system for value-anticipating task offloading includes one or more processors and a memory in communication with the one or more processors. The memory may include a task manager module. The task manager module may include instructions, that when executed by the one or more processors, cause the one or more processors to receive a task identifier of a computational task for an application being utilized by a vehicle processor of a vehicle and a state vector describing at least one state of the vehicle. The state vector may include a speed of the vehicle, heading angle changes of the vehicle, a location of the vehicle, a time of day, a day of the week, an object property of one or more objects external to the vehicle, historical offloading utility scores determined by the vehicle processor of the vehicle, and/or historical offloading utility scores determined by the vehicle processor of the vehicle, and history of the recent offloading decisions.

The task manager module may then cause the one or more processors to determine, using a utility function, a utility score of the computational task using the task identifier and the state vector. The utility score may represent an improvement in the functioning of the application if the computational task is offloaded to an external system for processing. Based on the utility score, the one or more processors may offload the computational task to the external system, process the computational task by the vehicle processor of the vehicle, or discard the computational task.

In another example, a method for value-anticipating task offloading includes the steps of receiving a task identifier of a computational task for an application being utilized by a vehicle processor of a vehicle and a state vector describing at least one state of the vehicle and determining, using a utility function, a utility score of the computational task using the task identifier and the state vector. Like before, the utility score represents an improvement in the functioning of the application if the computational task is offloaded to an external system for processing. Next, based on the utility score, the method may then offload the computational task to the external system for processing, process the computational task by the vehicle processor of the vehicle, or discard the computational task.

In yet another example, a non-transitory computer-readable medium stores instructions that, when executed by one or more processors, cause the one or more processors to receive a task identifier of a computational task for an application being utilized by a vehicle processor of a vehicle and a state vector describing at least one state of the vehicle and determine, using a utility function, a utility score of the computational task using the task identifier and the state vector. The utility score represents an improvement in the functioning of the application if the computational task is offloaded to an external system for processing. In some embodiments, the utility score is calculated for each possible processing option, namely, offloading, local processing and discarding. The action with the highest utility score will be taken by the vehicle. Again, based on the utility score, the instructions may then cause the one or more processors to offload the computational task to the external system for processing, process the computational task by the vehicle processor of the vehicle, or discard the computational task.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Figure 1:
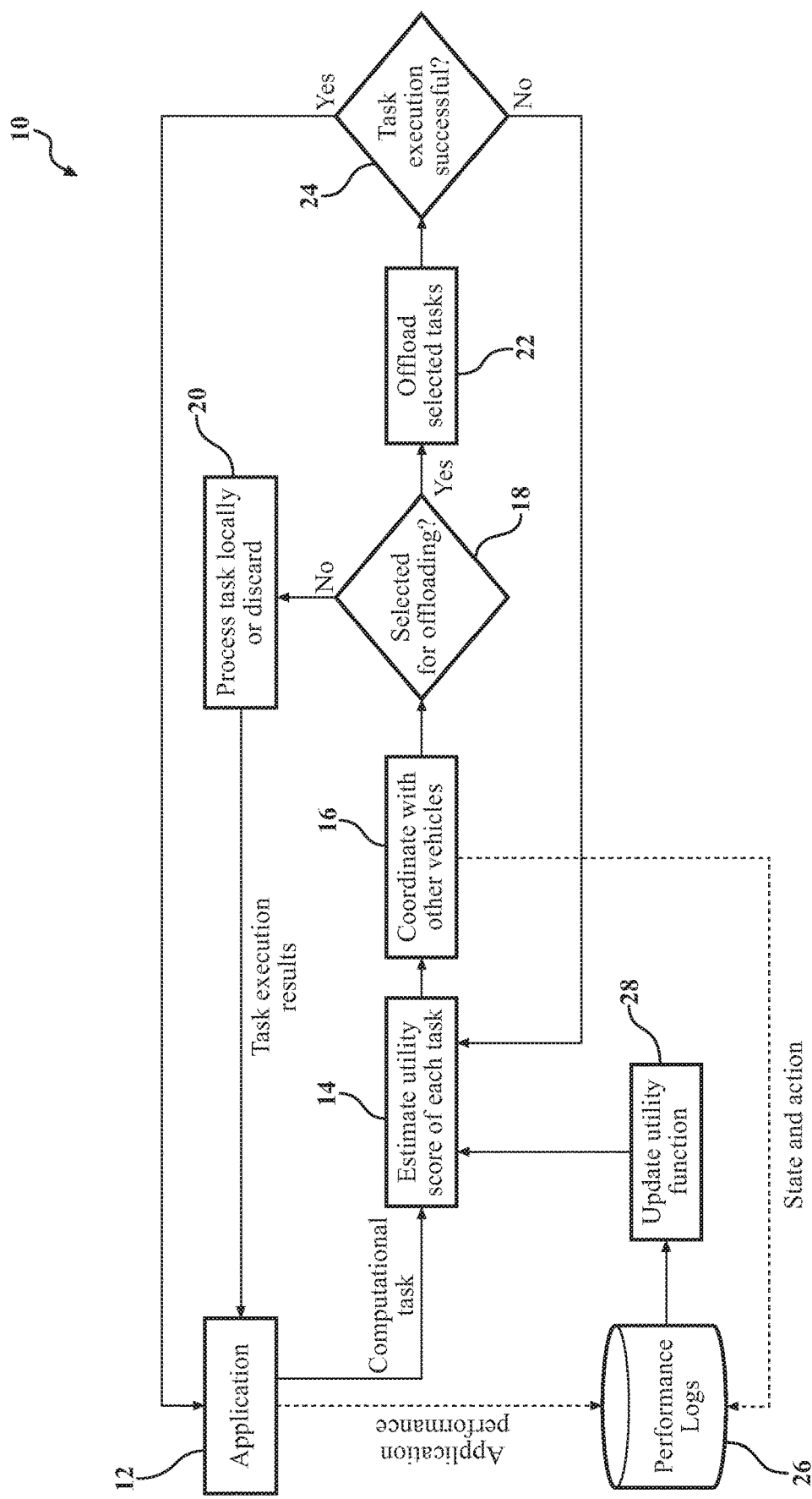
FIG. 1 illustrates a flow diagram for value-anticipating task offloading.

Described is a system and method for value-anticipating task offloading. Generally, with regards to the system, the system includes one or more processors and a memory containing instructions for offloading one or more computational tasks associated with an application being executed by a vehicle processor for a vehicle. In one example, the one or more processors and the memory may be located within the vehicle. The one or more processors of the vehicle receive a task identifier that identifies a computational task that is associated with an application being utilized by the vehicle processor. In addition to this information, a state vector may also be provided that describes at least one state of the vehicle. For example, the state vector could include information regarding the speed of the vehicle, changes in the heading of the vehicle, the location of the vehicle, time of day/week, the property of objects that are external to the vehicle, historical offloading utility scores determined by the vehicle processor of the vehicle, and/or historical offloading utility scores determined by the vehicle processor of the vehicle, and history of the recent offloading decisions.

Using the state vector and the computational task identifier, the one or more processors, through the use of a utility function, determine a utility score of the computational task. The utility function may be a machine learning algorithm that was trained using reinforcement learning to anticipate the expected value of offloading each computational task to an external system.

The utility score generally represents an improvement in the functioning of the application if the computational task is offloaded to an external system for processing. For example, if the application is an object detection application, the utility score could indicate a general difference between if the computational task associated with the application is performed by the vehicle processor or is offloaded to be processed by an external system. For example, the vehicle processor may only be able to execute a lightweight version of an object detection algorithm, while the external system could execute a much more computationally intensive but much more accurate object detection algorithm. Based on the utility score, the one or more processors may then offload the computational task to the external system for processing, process the computational task by the vehicle processor or discard the computational task altogether.

Additionally, the system and method may also include a task scheduler function that coordinates which computational tasks from multiple vehicles should be offloaded to an external system. In one example, a task scheduler module configures the one or more processors to receive a plurality of task identifiers for a plurality of computational tasks from several vehicles. Each of the task identifiers has a utility score associated with it, indicating the improvement in the application performance if the task is offloaded to an external system. Here, the task scheduler module causes the one or more processors to order the computational tasks by their utility scores. Based on the available computational resources of one or more external systems, computational tasks with the highest utility scores will be offloaded to be processed by one or more external systems, while the remaining tasks will either be processed by the vehicle processors of their respective vehicles or discarded altogether.

As such, the system and method for value-anticipating task offloading provides a solution for task offloading such that each computational task is evaluated to determine which computational tasks are the most important and would add the most value if they are offloaded. The computational tasks that are identified as having the most value if they are offloaded can then be prioritized such that they are offloaded. Conversely, computational tasks that had little to no value of being offloaded can be processed by the vehicle processor of the vehicle utilizing the application or can be discarded altogether.

In order to better understand how the system and method for value-anticipating task offloading operates, reference is made to FIG. 1, which illustrates a process flow 10 for value-anticipating task offloading. In one example, the process flow 10 begins with the application 12. The application 12 can be any application that may be executed by one or more processors of a device. In one example, the device may be a vehicle. The application 12, when being executed by the device, may require the processing of one or more computational tasks that may involve the processing of data. A computational task identifier that identifies a computational task for the application 12 is provided to a utility function 14. In addition to providing the identifier that identifies the computational task, information regarding the device, such as state information, referred to as a state vector, may be provided as well. If the device is a vehicle, the state vector may include information regarding the speed of the vehicle, heading changes of the vehicle, location of the vehicle, time/day, information regarding objects surrounding the vehicle, and the like.

Using the identifier and the state vector, the utility function 14 generates a utility score that indicates the overall improvement in the functioning of the application if the computational task, identified by the identifier, is performed by offloading the computational task to an external system. In some cases, the external system may have computational capabilities beyond those of the device. In those cases, the external system may be able to execute a more sophisticated, but computationally intense, version of the computational task identified by the identifier. As will be explained later, the utility function 14 is a machine learning algorithm that is trained utilizing reinforcement learning. A detailed description of the utility function 14 and the training of the utility function 14 will be provided later in this disclosure.

The process flow 10 may also include a task scheduler 16 that is able to coordinate the offloading and processing of computational tasks with other devices, such as other vehicles. For example, the task scheduler 16 may receive utility scores for a number of different computational tasks from a number of different vehicles. The task scheduler 16 may be able to sort the computational tasks via their utility scores and then select for offloading computational tasks with the highest utility scores. As such, at element 18, a selection is made which task should be offloaded and which data should either be processed locally by the processor of the device or discarded. As such, tasks that are not selected for offloading are processed locally or discarded, as indicated by element 20. The results of this local processing or discarding are then provided back to the application 12.

Figure 2A:
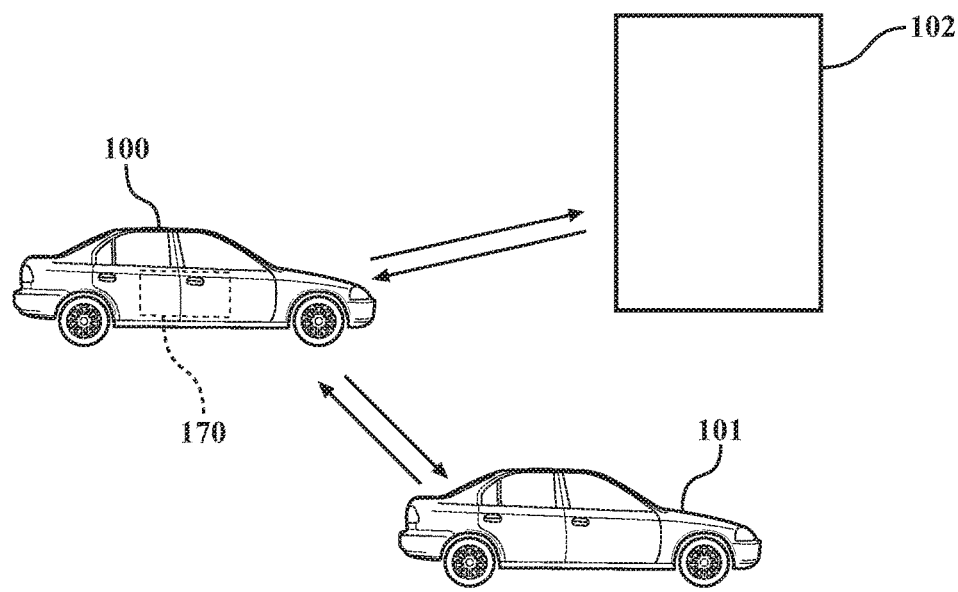
FIGS. 2A and 2B illustrate different examples of value-anticipating task offloading from a vehicle to another vehicle, a server, and/or a vehicle micro cloud.

Conversely, if the computational task is selected for offloading, the computational tasks that are selected for offloading are then offloaded, as indicated in step 22. The offloading of these tasks may involve transmitting information, such as the identifier of the computational task and any necessary data for processing to an external system. As stated before, the external system can be any external system capable of executing the offloaded computational task. For example, referring to FIG. 2A, assume the vehicle 100 is the device that is executing an application, such as the application 12, that includes one or more computational tasks. Here, the vehicle 100 also includes a value-anticipating task offloading system 170. If the value-anticipating task offloading system 170 determines that a task should be offloaded by evaluating the utility score, the task may be offloaded for computation to another vehicle, such as the vehicle 101 or an edge server 102, which could be an edge server or remote server.

Figure 2B:
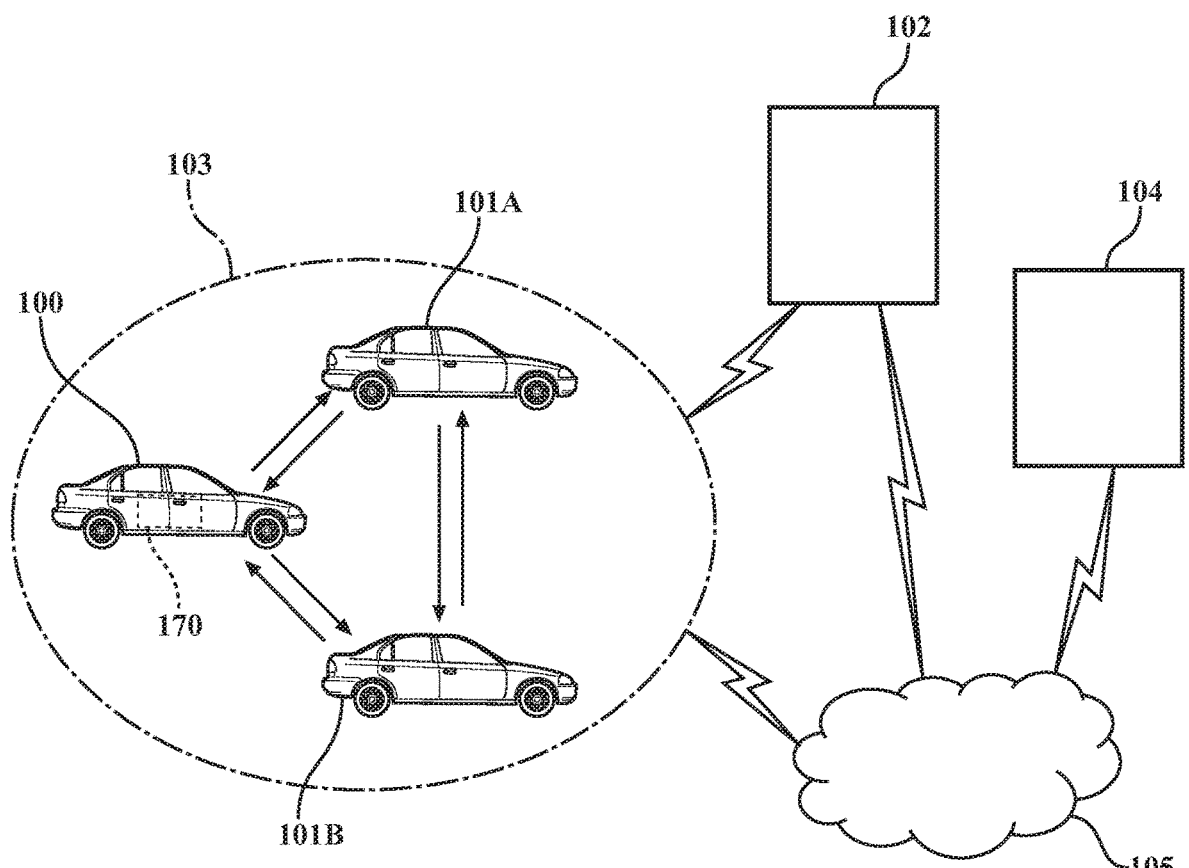

Other types of external systems can also be utilized. For example, referring to FIG. 2B, this figure illustrates that the vehicle 100 is part of a vehicular micro cloud 103. The vehicular micro cloud 103 also includes vehicles 101A and/or 101B. The vehicles 100, 101A, and/or 101B may communicate with each other using any one of a number of different communication methodologies, such as WiFi, Bluetooth, cellular communication protocols, dedicated short range communications (DSRC) and vehicle-to-X.

In one example, the vehicle micro cloud 103 may have a cloud leader, which could be any of the vehicles 100, 101A, and/or 101B. As such, the cloud leader could act as the task scheduler 16 and determine which task should be offloaded from which members of the vehicle micro cloud 103. In some circumstances, computational tasks may be offloaded from one vehicle, such as the vehicle 100, to another vehicle, such as the vehicle 101A and/or 101B. In other situations, the computational task may be sent to an edge server, such as edge server 102. Further still, the computational task may be sent to a remote server, such as remote server 104, via network 105. Again, it should be understood that the offloading of the computational task can be performed by any external device or combinations thereof.

Referring back to FIG. 1, if the computational task is successfully offloaded, element 24 indicates that a decision is made if the task has been executed successfully. If the task has been executed successfully, the processed information will be provided back to the application 12. Otherwise, information regarding the unexecuted task, such as the identifier of the task, is then returned to the application 12.

Additionally, the process flow 10 also indicates that the task scheduler 16 can generate a performance log 26 that contains information regarding the performance of certain tasks that have been offloaded and/or not offloaded. For example, the task scheduler 16 could record information regarding the task that was offloaded, the state vector associated with the task, and the general improvement by offloading the task in the performance log. This can be utilized to update the utility function to improve the precision of the utility scores, as indicated in element 28.

Figure 3:
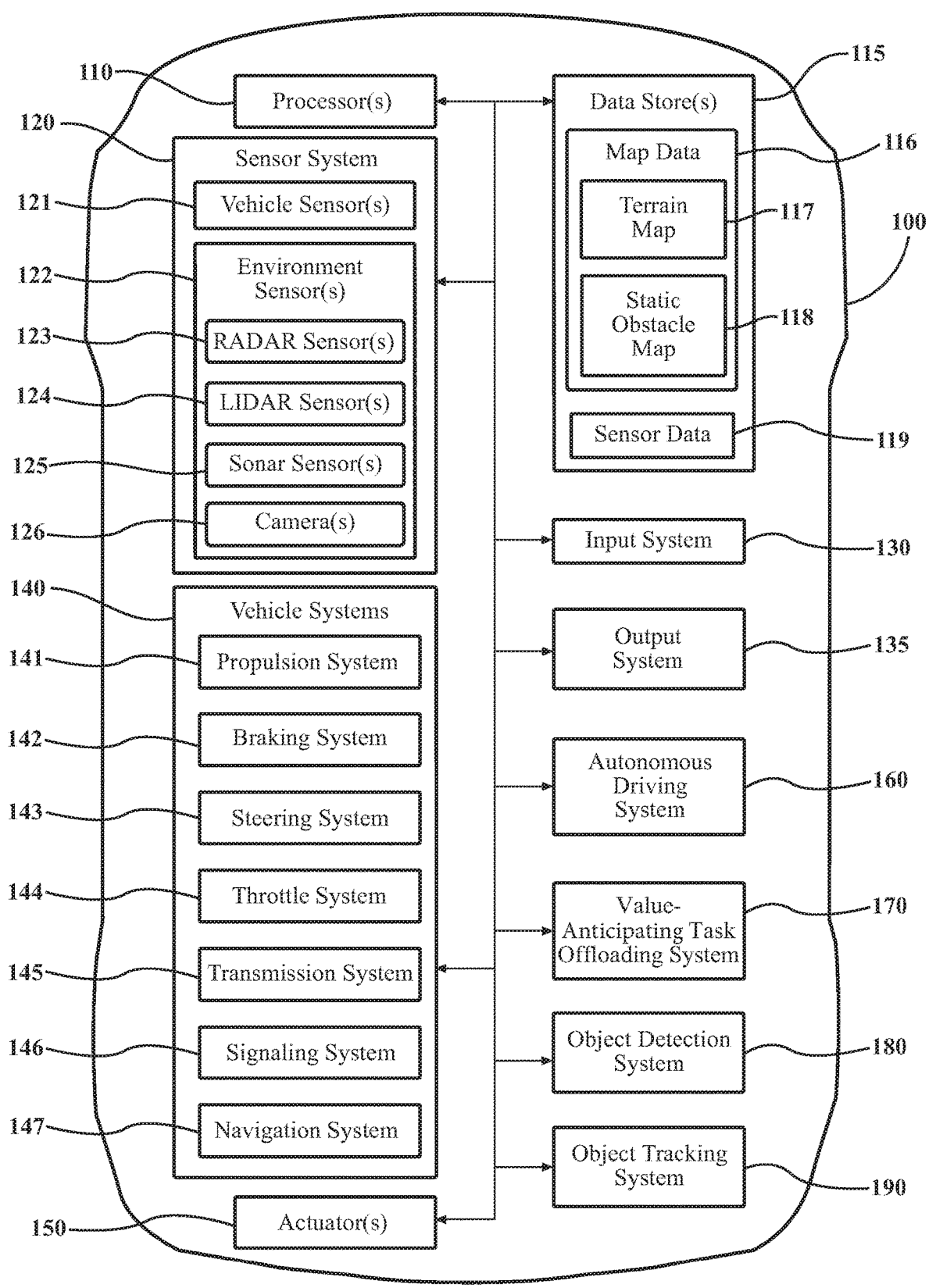
FIG. 3 illustrates a vehicle incorporating a value-anticipating task offloading system.

Now that a general overview of the value-anticipating task offloading process flow has been provided, reference is made to FIG. 3, which illustrates a vehicle 100 that is executing an application that may include one or more tasks that may be offloaded. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, includes one or more automated or autonomous systems, and thus benefits from the functionality discussed herein.

In various embodiments, the automated/autonomous systems or combination of systems may vary. For example, in one aspect, the automated system is a system that provides autonomous control of the vehicle according to one or more levels of automation such as the levels defined by the Society of Automotive Engineers (SAE) (e.g., levels 0-5). As such, the autonomous system may provide semi-autonomous control or fully autonomous control, as discussed in relation to an autonomous driving system 160 provided later in this specification.

The vehicle 100 also includes various elements. It will be understood that in various embodiments, it may not be necessary for the vehicle 100 to have all of the elements shown in FIG. 3. The vehicle 100 can have any combination of the various elements shown in FIG. 3. Further, the vehicle 100 can have additional elements to those shown in FIG. 3. In some arrangements, the vehicle 100 may be implemented without one or more of the elements shown in FIG. 3. While the various elements are shown as being located within the vehicle 100 in FIG. 3, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 3 and will be described along with subsequent figures. However, a description of many of the elements in FIG. 3 will be provided after the discussion of the figures for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

In either case, the vehicle 100 includes a value-anticipating task offloading system 170. The value-anticipating task offloading system 170 may, as explained previously, determine a utility score indicating the improvement in the functioning of an application executed by one or more processors of the vehicle 100 if it is offloaded.

With reference to FIG. 2, one embodiment of the value-anticipating task offloading system 170 is further illustrated. As shown, the value-anticipating task offloading system 170 includes one or more processor(s) 110. Accordingly, the processor(s) 110 may be a part of the value-anticipating task offloading system 170 or the value-anticipating task offloading system 170 may access the processor(s) 110 through a data bus or another communication path. In one or more embodiments, the processor(s) 110 is an application-specific integrated circuit that is configured to implement functions associated with a task manager module 220 and/or a task scheduler module 230. In some examples, the task manager module 220 and the task scheduler module 230 may be located on separate systems. For example, the vehicle 100 may include the task manager module 220, which generates a utility score for one or more computational tasks, while the task scheduler module 230 may be operated on an external system, such as a vehicle micro cloud, edge server, remote server, and the like.

In general, the processor(s) 110 is an electronic processor such as a microprocessor that is capable of performing various functions as described herein. In one embodiment, the value-anticipating task offloading system 170 includes a memory 210 that stores the task manager module 220 and/or the task scheduler module 230. The memory 210 is a random-access memory (RAM), read-only memory (ROM), a hard disk drive, a flash memory, or other suitable memory for storing the task manager module 220 and/or the task scheduler module 230. The task manager module 220 and/or the task scheduler module 230 are, for example, computer-readable instructions that, when executed by the processor(s) 110, cause the processor(s) 110 to perform the various functions disclosed herein.

Furthermore, in one embodiment, the value-anticipating task offloading system 170 includes one or more data store(s) 240. The data store(s) 240 is, in one embodiment, an electronic data structure such as a database that is stored in the memory 210 or another memory and that is configured with routines that can be executed by the processor(s) 110 for analyzing stored data, providing stored data, organizing stored data, and so on. Thus, in one embodiment, the data store(s) 240 stores data used by the task manager module 220 and/or the task scheduler module 230 in executing various functions. In one embodiment, the data store(s) 240 includes one or more utility function(s) 250 and one or more performance log(s) 260.

With regards to the utility function(s) 250, the utility function(s) 250 may be a machine learning algorithm that receives, as inputs, an identifier of a particular computational task being executed to support an application utilized by the vehicle 100. The application can be any type of application, such as object detection, object tracking, autonomous driving, active safety systems, etc. Again, the term application should be construed broadly to include any type of application as executable by processors, such as the processor(s) 110 of the vehicle 100.

The utility function(s) 250, in addition to receiving the identifier of a particular computational task, may also receive state information related to the state of the vehicle 100. The state information may be in the form of a state vector that can include vehicle-related information, such as the speed of the vehicle 100, changes in the heading of the vehicle 100, day of the week, time of day, location of the vehicle 100, number and type of object surrounding the vehicle 100 and historical information, such as information regarding what types of computational tasks have been offloaded for computation remotely from the vehicle 100. The utility function(s) 250 may include information 252 that may be in the form of one or more tables or one or more model weights that affect the output of the utility function(s) 250. Ultimately, the output of the utility function(s) 250 is a utility score that generally indicates the improvement in the functioning of the application if a particular computing task is offloaded from the vehicle 100 to an external system, such as other vehicles, vehicular micro clouds, edge servers, remote servers, combinations thereof, and the like.

In one example, the utility function(s) 250 employees a reinforcement learning algorithm to learn the optimal decision policy. The utility function(s) 250 may be trained from the past history of <state, action, reward> tuples, where the state is the state vector for the time the offloading decision was made, the action signifies if the task was (a) offloaded (b) locally processed or (c) discarded and the reward indicates the gain in terms of (i) improvement of application performance and (ii) savings of network/compute resources. In some embodiments, one may train the utility function by reinforcement learning (e.g., Q learning). Different applications and/or computational tasks may have different criteria on the task utility. Therefore, the utility function(s) 250 are preferably trained on a per-task-type basis.

In some embodiments, the reward for offloading a task in an object tracking application may be defined as follows: (reward)=$-w_1$ ((object tracking error with offloading)−(object tracking error w/o offloading))−$w_2$ (computational resource needed for offloading)−$w_3$ (network resource needed for offloading), where the weights $w_1$, $w_2$ and $w_3$ are constant system parameters. The system may perform regression against historical performance logs to model the relationship between the set of input parameters and the reward, and use this regression function to predict the expected reward for offloading In some embodiments, the utility function(s) 250 are trained offline. In one example involving a preliminary data collection campaign to record a large amount of sensor data, the recorded sensor data is subsequently analyzed by multiple sensor data processing algorithms, including (i) a lightweight algorithm used by low-end vehicles and (ii) a resource-intensive algorithm used by high-end vehicles and cloud/edge servers. Based on the results from (i) and (ii), one can simulate the state and application performance with different patterns of offloading decisions.

In some embodiments, task scheduler module 230 keeps the history of the <state, action, reward> tuples in the performance log(s) 260. The task scheduler module 230 may cause the processor(s) 110 to periodically update the utility function(s) 250 based on the historical data up to that point in time. In some embodiments, the historical data may be shared with a cloud/edge server, which updates the utility function(s) 250 using the historical data collected from multiple vehicles and distributes the new function to the vehicles over vehicular networks.

In one example, the reinforcement learning algorithm may utilize Q learning to learn how the utility function(s) 250 should create the appropriate utility score based on the identifier of the computational task in the state factor of the vehicle 100. In its basic form, a reinforcement learning framework generally includes an agent, a set of states S, a set of actions A that can be taken at each state. The agent transitions from one state to another whenever an action is taken. The agent attempts to take an optimal series of actions that maximizes the total expected reward that it gains over time. The idea of Q-learning is to maintain a so-called Q-table, which describes the expected long-term reward for taking each candidate action at every possible state. At the beginning, the Q-table is initialized with random rewards. Then at each time step i, the agent selects one of the possible actions $a_i$, observes a reward $r_i$ and transitions to a new state $s_{i+1}$. Based on the new state and the given reward, the agent may update the corresponding entry in the Q-table using the following Bellman equation:

$$Q^{new}(s_i,a_i) \leftarrow (1-\alpha)Q(s_i,a_i)+\alpha[r_i+\gamma \max Q(s_{i+1},a)],$$

where the learning rate $\alpha$ and discount factor $\gamma$ are given as system parameters.

At each time step, the agent selects a random action (i.e., exploration) with probability E. Otherwise, it selects an action that maximizes the expected long-term reward according to the Q-table (i.e., exploitation). The parameter E is typically set high at the initial stage of training to more aggressively explore better actions and is gradually decreased as the training progresses. In one example, the parameter E is set to $E=0.9\times0.997^j$, where j is the number of episodes over which the Q-table has been trained. The key design question associated with Q-learning is how to define state, actions, and rewards. For action, the agent (i.e., decision-maker) has three different options, namely, local processing, offload, and discard.

With regards to the task manager module 220, the task manager module 220 may include instructions that cause the processor(s) 110 to receive a task identifier of a computational task and a state vector that describes at least one state of the vehicle 100. The state vector may include information such as the speed of the vehicle 100, changes in the heading angle of the vehicle 100, location of the vehicle 100, time of day/week, an object property of one or more objects external to the vehicle, and historical offloading utility scores determined by the vehicle processor of the vehicle.

The state vector may play a role in determining the overall utility score. For example, if the application is an object detection and/or tracking type application, the state vector of the vehicle may impact the utility score. For example, vehicles that are traveling quickly, will need additional computational resources to track objects quickly. If a vehicle is traveling very slowly, objects are more easily detected and tracked. Similarly, if the vehicle heading is stable, relative motion of objects with respect to ego vehicle may be less thus negating the advantage of offloading the computational task to an external system. Location can also play a role, as fewer objects are likely to be detected if the vehicle is operating in a rural environment, as opposed to a city environment.

The task manager module 220 may then cause the processor(s) 110 to determine, using the utility function(s) 250, a utility score of the computational task using the task identifier and the state vector. As stated before, the utility function(s) 250 may be a machine learning algorithm that was trained using reinforcement learning. The utility score, as explained previously, indicates an overall improvement in the functioning of the application if the computational task is executed by an external system, such as another vehicle, edge server, remote server, vehicular micro cloud, and the like.

The task manager module 220 may then cause the processor(s) 110 to evaluate the utility score and determine if the computational task should be offloaded to an external system for processing, process the computational task locally by the processor(s) 110 of the vehicle 100, or discard the computational task altogether.

With regards to the task scheduler module 230, the task scheduler module 230 may include instructions that cause the processor(s) 110 to coordinate the execution of any potentially offloaded computational tasks with other vehicles and/or devices. In one example, the task scheduler module 230 may be executed by the processor(s) 110 of the vehicle 100. Conversely, it should be understood that the task scheduler module 230 may be executed by the processors of other devices, such as other vehicles, edge servers, remote servers, vehicle micro clouds, and the like.

After the utility score of each task is determined, the vehicle 100 may optionally share the utility scores with other vehicles in the vicinity. One or more of the vehicles participating in the coordination process and/or a remote server sort all the candidate tasks in descending order of their utility scores and select the subset of them up to the limit of computing and communication resources. The task scheduler module 230 also causes the processor(s) 110 to determine which vehicle/remote server to offload each task. The result of task scheduling is then advertised to all the vehicles involved in the coordination process.

In some embodiments, vehicles do not make any coordination. The vehicles individually sort their own candidate tasks in descending order of utility scores and select a subset of them up to the amount of bandwidth resources available in vehicular networks and the compute resources available in remote vehicles/servers.

Here, the task scheduler module 230 causes the processor(s) 110 to receive a plurality of task identifiers from multiple devices, such as other vehicles. In addition to receiving identifiers of different computational tasks, the processor(s) 110 may also receive utility scores for each of the identifiers of the different computational tasks. As such, in one example, each identifier of each computational task includes a utility score, which, as previously stated, generally indicates the improvement of an application if a task is processed by an external system.

The task scheduler module 230 may cause the processor(s) 110 to select the computational task to be processed by the external system or local systems based on the utility scores of the computational tasks and the available computational resources of the one or more external systems. In one example, the task scheduler module 230 causes the processor(s) 110 to organize each of the identifiers for each computational task by order of utility score. Computational tasks having the highest utility scores will be processed by one or more external systems based on the available resources of the one or more external systems. Tasks that are not offloaded to the external systems for processing may either be discarded or may be processed by the local processor of each device. In this case, computational tasks that are not offloaded from the processor(s) 110 of the vehicle 100 may either be then processed by the processor(s) 110 of the vehicle 100 or otherwise discarded. Tasks that are offloaded to an external system are then processed by the external system, and the results of these are then sent back to the device, such as the vehicle 100, from which the computational task was offloaded.

As stated before, the task scheduler module 230 may also cause the processor(s) 110 to generate one or more performance log(s) 260. The performance log(s) 260 generally contain information regarding the state vectors of any vehicles that are provided computational tasks and utility scores as candidates to be offloaded and processed by an external system, task identifiers of these computational tasks, and reward indicating the improvement in the functioning of the underlying application. Information stored in the performance log(s) 260 may be utilized to update the utility function(s) 250 so that the utility function(s) 250 can more accurately determine utility scores in the future.

Figure 5:
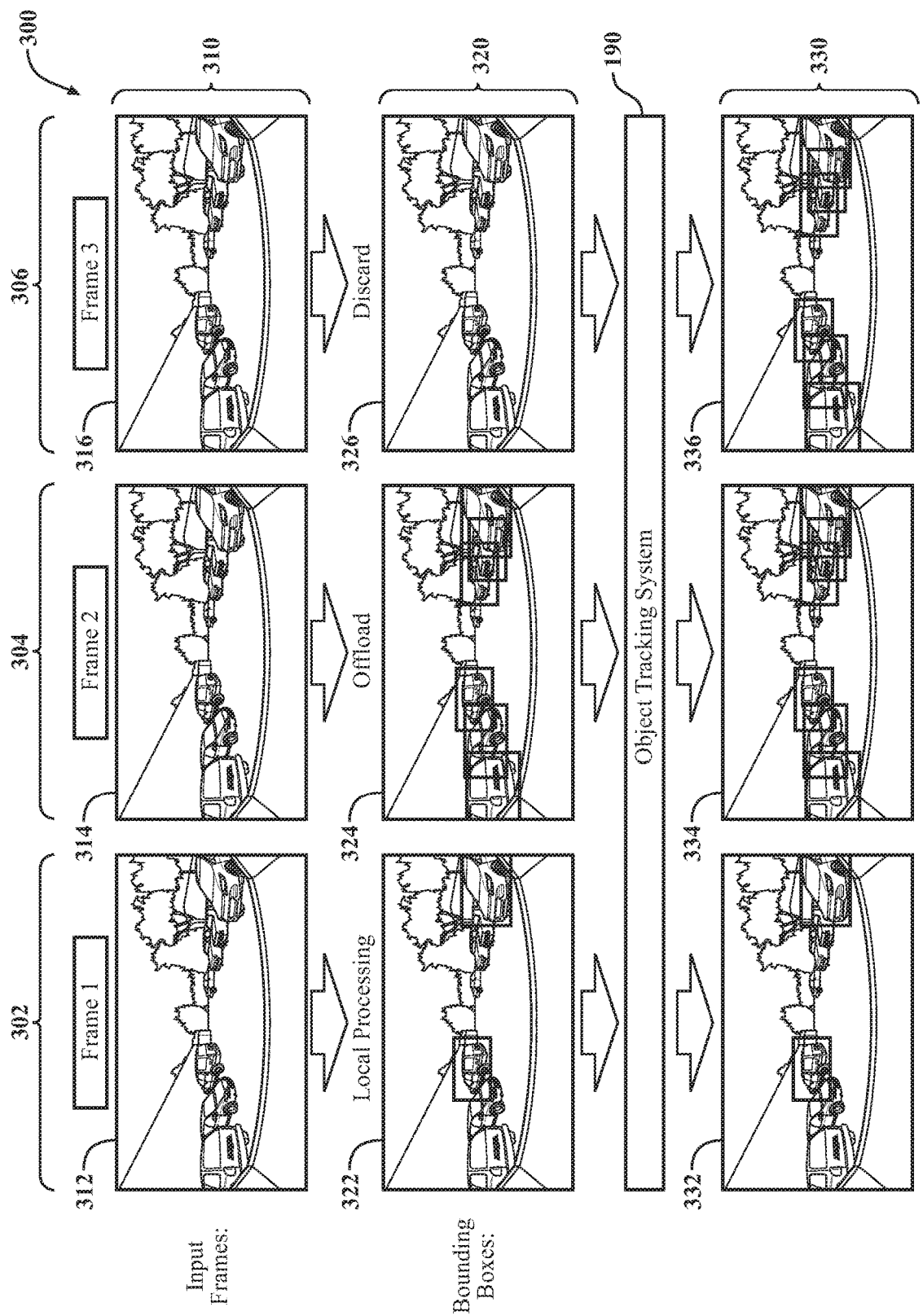
FIG. 5 illustrates an example of value-anticipating task offloading that offloads an object detection type computational task.

FIG. 5 shows an illustrative example 300 of offloading decisions in an object tracking application. In this example 300, a vehicle, such as the vehicle 100 of FIG. 3, periodically obtains a new input frames 312, 314, and 316 from its on-board camera, as illustrated in the top row 310. If the vehicle 100 decides to offload processing of a frame to a powerful remote vehicle or a remote server, it can obtain the accurate object detection results (i.e., bounding boxes) as in the frame 324 in the middle row 320. Otherwise, the vehicle 100 either locally processes the image with a lightweight algorithm as in the frame 322 or does not apply any detection algorithm as in the third frame 326. The lightweight detection algorithm may miss some of the objects due to the limited detection capability. The resulting bounding boxes from each frame 322, 324, and 326 are then passed to an object tracking system 190, which performs association between bounding boxes in contiguous frames 332, 334, and 336 of row 330. While the third frame 336 is omitted in the detection subtask, some tracking algorithms may be able to extrapolate the positions of bounding boxes from the frame 332 and/or 334. This effectively reduces resource consumption without causing a significant impact on the final tracking results.

Figure 4:
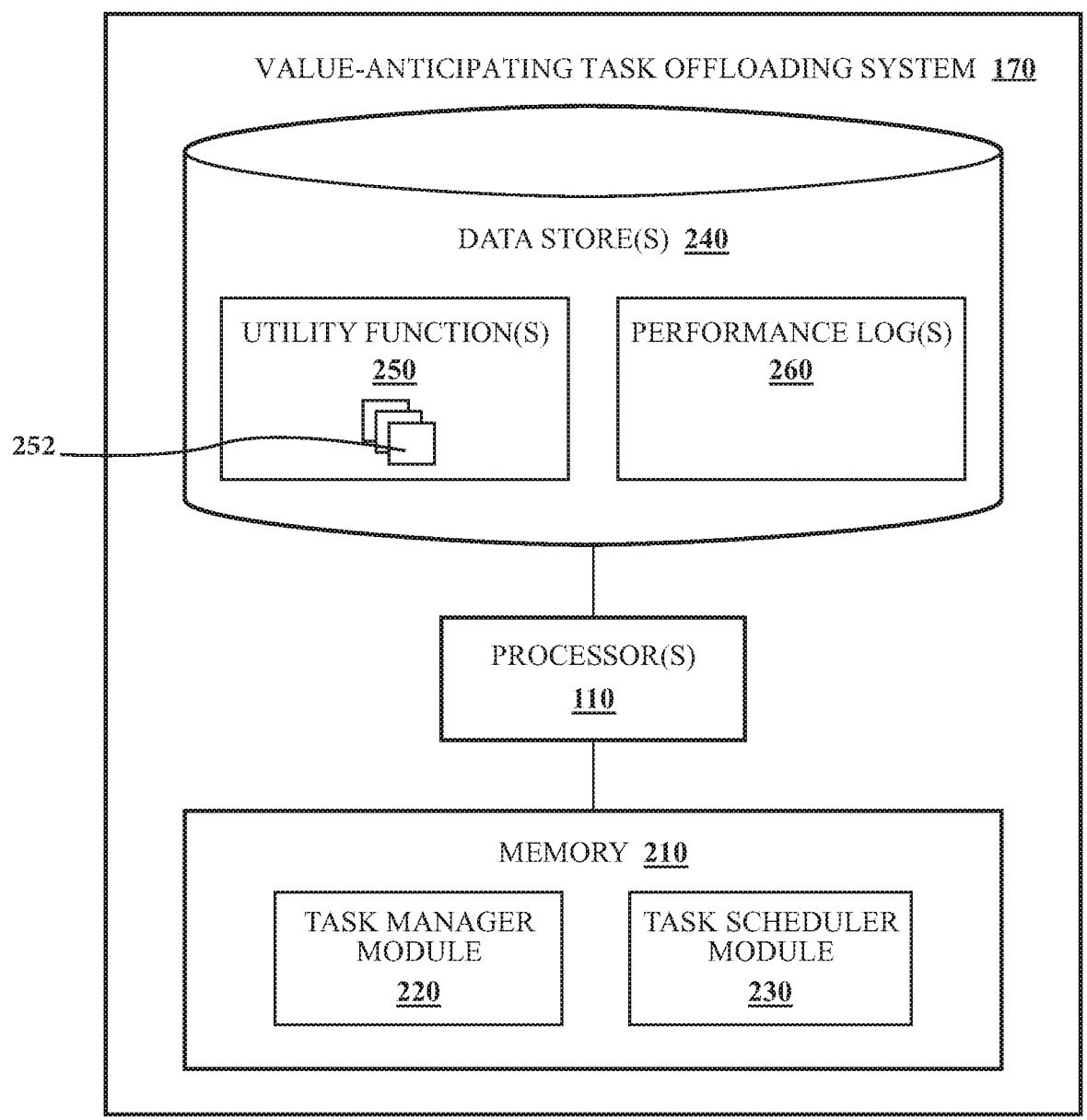
FIG. 4 illustrates a more detailed view of the value-anticipating task offloading system of FIG. 3.
Figure 6:
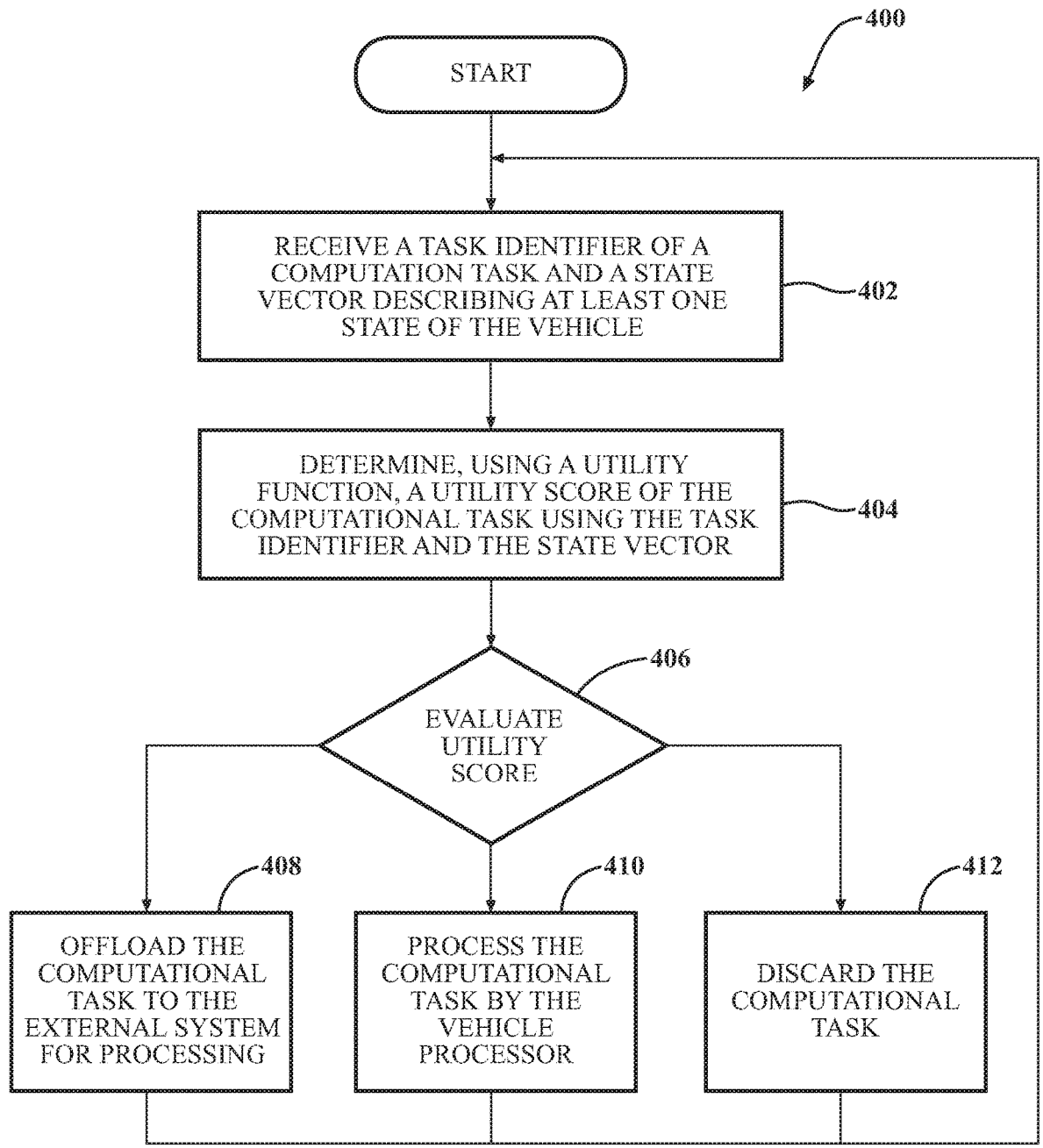
FIG. 6 illustrates a method of value-anticipating task offloading by a task manager module.

Referring to FIG. 6, a method 400 for determining which tasks should be offloaded for processing is shown. The method 400 will be described from the viewpoint of the vehicle 100 of FIG. 3 and the value-anticipating task offloading system 170 of FIG. 4. However, it should be understood that this is just one example of implementing the method 400. While method 400 is discussed in combination with the value-anticipating task offloading system 170, it should be appreciated that the method 400 is not limited to being implemented within the value-anticipating task offloading system 170, but is instead one example of a system that may implement the method 400.

In step 402, the task manager module 220 may include instructions that cause the processor(s) 110 to receive a task identifier of a computational task and a state vector that describes at least one state of the vehicle 100. The state vector may include information such as the speed of the vehicle 100, changes in the heading angle of the vehicle 100, location of the vehicle 100, time of day/week, an object property of one or more objects external to the vehicle, and historical offloading utility scores determined by the vehicle processor of the vehicle.

In step 404, the task manager module 220 may then cause the processor(s) 110 to determine, using the utility function(s) 250, a utility score of the computational task using the task identifier and the state vector. As stated before, the utility function(s) 250 may be a machine learning algorithm that was trained using reinforcement learning. The utility score, as explained previously, indicates an overall improvement in the functioning of the application if the computational task is executed by an external system, such as another vehicle, edge server, remote server, vehicular micro cloud, and the like.

In step 406, the task manager module 220 may then cause the processor(s) 110 to evaluate the utility score and determine if the computational task should be offloaded to an external system for processing (step 408), process the computational task locally by the processor(s) 110 of the vehicle 100 (step 410), or discard the computational task altogether (step 412). Thereafter, the method 400 may return to step 402.

Figure 7:
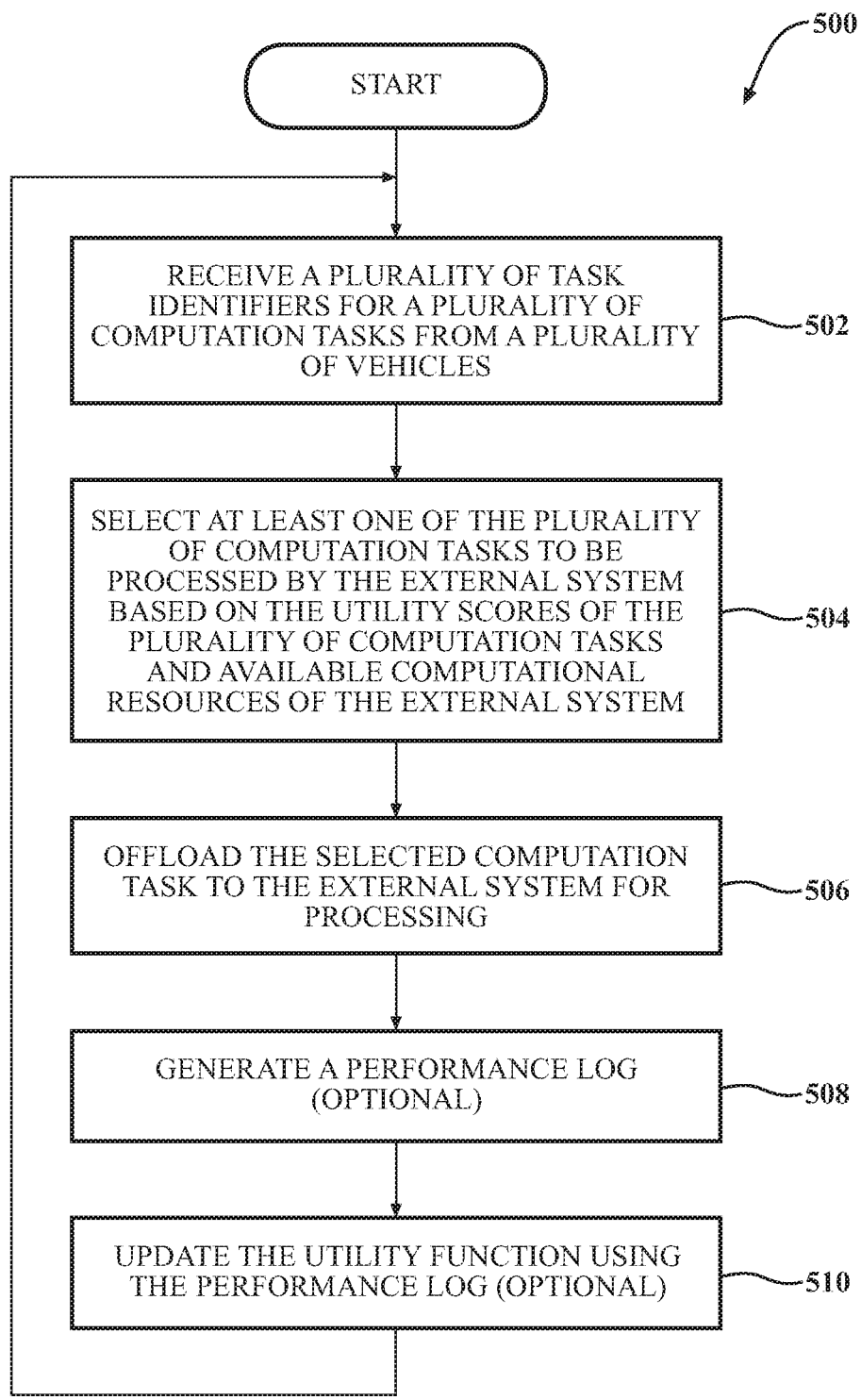
FIG. 7 illustrates a method of value-anticipating task offloading by a scheduler module.

Referring to FIG. 7, a method 500 for scheduling the offloading of tasks is shown. The method 500 will be described from the viewpoint of the vehicle 100 of FIG. 3 and the value-anticipating task offloading system 170 of FIG. 4. However, it should be understood that this is just one example of implementing the method 500. While method 500 is discussed in combination with the value-anticipating task offloading system 170, it should be appreciated that the method 500 is not limited to being implemented within the value-anticipating task offloading system 170, but is instead one example of a system that may implement the method 500.

In step 502, the task scheduler module 230 causes the processor(s) 110 to receive a plurality of task identifiers from multiple devices, such as other vehicles. In addition to receiving identifiers of different computational tasks, the processor(s) 110 may also receive utility scores for each of the identifiers of the different computational tasks. As such, in one example, each identifier of each computational task includes a utility score, which, as previously stated, generally indicates the improvement of an application if a task is processed by an external system.

In step 504, the task scheduler module 230 may cause the processor(s) 110 to select the computational task to be processed by the external system or systems based on the utility scores of the computational tasks and the available computational resources of the one or more external systems. In one example, the task scheduler module 230 causes the processor(s) 110 to organize each of the identifiers for each computational task by order of utility score.

In step 506, the task scheduler module 230 may cause the processor(s) 110 offload the selected computational tasks to an external system for processing. Computational tasks having the highest utility scores will be processed by one or more external systems based on the available resources of the one or more external systems. Tasks that are not offloaded to the external systems for processing may either be discarded or may be processed by the local processor of each device.

Optionally, as shown in step 508, the task scheduler module 230 may also cause the processor(s) 110 to generate one or more performance log(s) 260. The performance log(s) 260 generally contain information regarding the state vectors of any vehicles that are provided computational tasks and utility scores as candidates to be offloaded and processed by an external system, task identifiers of these computational tasks, and reward indicating the improvement in the functioning of the underlying application. Also optionally, as shown in step 510, information stored in the performance log(s) 260 may be utilized to update the utility function(s) 250 so that the utility function(s) 250 can more accurately determine utility scores in the future.

FIG. 3 will now be discussed in full detail as an example environment within which the system and methods disclosed herein may operate. In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route.

The vehicle 100 can include one or more processor(s) 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain map(s) 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle map(s) 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located on-board the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data stores 115, and/or another element of the vehicle 100 (including any of the elements shown in FIG. 3). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensor(s) 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensor(s) 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 3. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, an object detection system 180 for detecting objects external to the vehicle 100, the object tracking system 190 for tracking objects detected by the object detection system 180, and/or the autonomous driving system 160 can be operatively connected to communicate with the vehicle systems 140 and/or individual components thereof. For example, returning to FIG. 3, the processor(s) 110 and/or the autonomous driving system 160 can be in communication to send and/or receive information from the vehicle systems 140 to control the movement, speed, maneuvering, heading, direction, etc. of the vehicle 100. The processor(s) 110 and/or the autonomous driving system 160 may control some or all of these vehicle systems 140 and, thus, may be partially or fully autonomous.

The processor(s) 110 and/or the autonomous driving system 160 can be operatively connected to communicate with the vehicle systems 140 and/or individual components thereof. For example, returning to FIG. 3, the processor(s) 110 and/or the autonomous driving system 160 can be in communication to send and/or receive information from the vehicle systems 140 to control the movement, speed, maneuvering, heading, direction, etc. of the vehicle 100. The processor(s) 110 and/or the autonomous driving system 160 may control some or all of these vehicle systems 140.

The processor(s) 110 and/or the autonomous driving system 160 may be operable to control the navigation and/or maneuvering of the vehicle 100 by controlling one or more of the vehicle systems 140 and/or components thereof. For instance, when operating in an autonomous mode, the processor(s) 110 and/or the autonomous driving system 160 can control the direction and/or speed of the vehicle 100. The processor(s) 110 and/or the autonomous driving system 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving system 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include an autonomous driving system 160. The autonomous driving system 160 can be configured to receive data from the sensor system 120 and/or any other type of system capable of capturing information relating to the vehicle 100 and/or the external environment of the vehicle 100. In one or more arrangements, the autonomous driving system 160 can use such data to generate one or more driving scene models. The autonomous driving system 160 can determine position and velocity of the vehicle 100. The autonomous driving system 160 can determine the location of obstacles, obstacles, or other environmental features including traffic signs, trees, shrubs, neighboring vehicles, pedestrians, etc.

The autonomous driving system 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving system 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include accelerating, decelerating, braking, turning, moving in a lateral direction of the vehicle 100, changing travel lanes, merging into a travel lane, and/or reversing, just to name a few possibilities. The autonomous driving system 160 can be configured to implement determined driving maneuvers. The autonomous driving system 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving system 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method comprising the steps of:
receiving a task identifier of a computational task for an application being utilized by a vehicle processor of a vehicle and a state vector describing at least one state of the vehicle;
determining, using a utility function, a utility score of the computational task using the task identifier and the state vector, wherein the utility score represents an improvement in a functioning of the application if the computational task is offloaded to an external system for processing; and
based on the utility score, performing one of:
offloading the computational task to the external system for processing,
processing the computational task by the vehicle processor of the vehicle, and
discarding the computational task.

2. The method of claim 1, wherein the state vector includes at least one of: a speed of the vehicle, a heading angle change of the vehicle, a location of the vehicle, a time of day, a day of week, an object property of one or more objects external to the vehicle, historical offloading utility scores determined by the vehicle processor of the vehicle, and history of the recent offloading decisions.

3. The method of claim 1, wherein the utility function is a trained machine learning algorithm.

4. The method of claim 3, wherein the utility function is trained by reinforcement learning to maximize the improvement in the functioning of the application based on the state vector of the vehicle and if the computational task was processed by the vehicle processor or the external system.

5. The method of claim 1, further comprising the steps of:
receiving a plurality of task identifiers for a plurality of computational tasks from a plurality of vehicles, the plurality of computational tasks having utility scores;
selecting at least one of the plurality of computational tasks to be processed by the external system based on the utility scores and available computational resources of the external system; and
offloading the selected at least one of the plurality of computational tasks by the external system.

6. The method of claim 5, further comprising the steps of generating a performance log that includes for each of the at least one of the plurality of computational tasks processed by the external system:
state vectors of the plurality of vehicles,
the plurality of task identifiers for the plurality of computational tasks, and
a reward indicating the improvement in the functioning of the application.

7. The method of claim 6, further comprising the step of updating the utility function using the performance log.

8. The method of claim 1, wherein the external system is at least one of: another vehicle, an edge server, and one or more external vehicles forming a vehicle micro cloud.

9. A system comprising:
one or more processors; and
a memory in communication with the one or more processors, the memory having a task manager module having instructions that, when executed by the one or more processors, causes the one or more processors to:
receive a task identifier of a computational task for an application being utilized by a vehicle processor of a vehicle and a state vector describing at least one state of the vehicle,
determine, using a utility function, a utility score of the computational task using the task identifier and the state vector, wherein the utility score represents an improvement in a functioning of the application if the computational task is offloaded to an external system for processing, and
based on the utility score, performing one of:
offload the computational task to the external system for processing,
process the computational task by the vehicle processor of the vehicle, and
discard the computational task.

10. The system of claim 9, wherein the state vector includes at least one of: a speed of the vehicle, a heading angle change of the vehicle, a location of the vehicle, a time of day, a day of week, an object property of one or more objects external to the vehicle, historical offloading utility scores determined by the vehicle processor of the vehicle, and history of the recent offloading decisions.

11. The system of claim 9, wherein the utility function is a trained machine learning algorithm.

12. The system of claim 11, wherein the utility function is trained by reinforcement learning to maximize the improvement in the functioning of the application based on the state vector of the vehicle and if the computational task was processed by the vehicle processor or the external system.

13. The system of claim 9, wherein the memory further comprises a task scheduler module having instructions that, when executed by the one or more processors, causes the one or more processors to:
receive a plurality of task identifiers for a plurality of computational tasks from a plurality of vehicles, the plurality of computational tasks having utility scores;
select at least one of the plurality of computational tasks to be processed by the external system based on the utility scores and available computational resources of the external system; and
offload the selected at least one of the plurality of computational tasks to the external system for processing.

14. The system of claim 13, wherein the task scheduler module further includes instructions that, when executed by the one or more processors causes the one more processors to generate a performance log that includes for each of the at least one of the plurality of computational tasks processed by the external system:
    state vectors of the plurality of vehicles,
    the plurality of task identifiers for the plurality of computational tasks, and
    a reward indicating the improvement in the functioning of the application.

15. The system of claim 14, wherein the memory further includes a training module, the training module having instructions that, when executed by the one or more processors causes the one or more processors to update the utility function using the performance log.

16. The system of claim 9, wherein the external system is at least one of: another vehicle, an edge server, and one or more vehicles forming a vehicular micro cloud.

17. The system of claim 9, wherein the one or more processors are located within at least one of the vehicle, another vehicle, an edge server, and one or more vehicles forming a vehicular micro cloud.

18. A non-transitory computer-readable medium storing instructions that, when executed by one or more processors, cause the one or more processors to:
    receive a task identifier of a computational task for an application being utilized by a vehicle processor of a vehicle and a state vector describing at least one state of the vehicle;
    determine, using a utility function, a utility score of the computational task using the task identifier and the state vector, wherein the utility score represents an improvement in a functioning of the application if the computational task is offloaded to an external system for processing; and
    based on the utility score, performing one of:
        offload the computational task to the external system for processing,
        process the computational task by the vehicle processor of the vehicle, and
        discard the computational task.

19. The non-transitory computer-readable medium of claim 18, wherein the state vector includes at least one of: a speed of the vehicle, a heading angle change of the vehicle, a location of the vehicle, a time of day, a day of week, an object property of one or more objects external to the vehicle, historical offloading utility scores determined by the vehicle processor of the vehicle, and history of the recent offloading decisions.

20. The non-transitory computer-readable medium of claim 18, further storing instructions that, when executed by one or more processors, cause the one or more processors to
    receive a plurality of identifiers for a plurality of computational tasks from a plurality of vehicles, the plurality of computational tasks having utility scores;
    select at least one of the plurality of computational tasks to be processed by the external system based on the utility scores and available computational resources of the external system; and
    offload the selected at least one of the plurality of computational tasks to the external system for processing.

\* \* \* \* \*